(12) United States Patent
Stockhausen et al.

(10) Patent No.: US 8,818,059 B2
(45) Date of Patent: Aug. 26, 2014

(54) METHOD AND DEVICE FOR NAVIGATION IN A MULTI-DIMENSIONAL IMAGE DATA SET

(75) Inventors: Jens Stockhausen, Eching (DE); Horst Joachim Mayer, Munich (DE)

(73) Assignee: Tomtec Imaging Systems GmbH (DE)

( * ) Notice: Subject to any disclaimer, the term of this patent is extended or adjusted under 35 U.S.C. 154(b) by 580 days.

(21) Appl. No.: 13/141,214

(22) PCT Filed: Dec. 1, 2009

(86) PCT No.: PCT/EP2009/066160
§ 371 (c)(1),
(2), (4) Date: Sep. 12, 2011

(87) PCT Pub. No.: WO2010/072521
PCT Pub. Date: Jul. 1, 2010

(65) Prior Publication Data
US 2011/0317899 A1      Dec. 29, 2011

(30) Foreign Application Priority Data

Dec. 23, 2008   (DE) .......................... 10 2008 055 132

(51) Int. Cl.
*G06K 9/00*        (2006.01)
(52) U.S. Cl.
USPC ........................................ 382/128; 382/154
(58) Field of Classification Search
USPC ........... 382/128, 131, 154; 600/437, 440, 443
See application file for complete search history.

(56) References Cited

U.S. PATENT DOCUMENTS

| 7,108,658 B2 | 9/2006 | Brandl et al. ................. 600/443 |
| 8,155,407 B2 | 4/2012 | Stockhausen et al. ........ 382/128 |
| 2006/0056690 A1* | 3/2006 | Schoisswohl et al. ........ 382/173 |
| 2007/0279436 A1 | 12/2007 | Ng et al. ...................... 345/624 |
| 2008/0100612 A1 | 5/2008 | Dastmalchi et al. .......... 345/418 |
| 2009/0153548 A1* | 6/2009 | Rabben et al. ................ 345/419 |
| 2010/0040200 A1* | 2/2010 | Ema et al. .................. 378/98.12 |

FOREIGN PATENT DOCUMENTS

| DE | 10339979 A1 | 4/2005 | ............. G06T 15/00 |
| WO | 2004/095378 A1 | 11/2004 | ............. G06T 17/40 |
| WO | 2006/056614 A1 | 6/2006 | ................ G06T 5/00 |
| WO | 2007/096214 A1 | 8/2007 | ................ G06T 7/00 |

OTHER PUBLICATIONS

International Search Report issued Apr. 8, 2010 by the European Patent Office re: PCT/EP2009/066160 citing; WO 2006/056614 A1, WO 2007/096214 A1, WO 2004/095378 A1, DE 103 39 979 A1, US 2008/100612 A1 and US 2007/279436 A1.

M. Jahnke, "3D-Exploration von Volumendaten", Rhein. Friedrich-Wilhelms—Univ. Bonn, 1998, TS, pp. i-iv, 1-19 and 65-91.

K. Kaiser, "Hardwareorientierte Schnittflachendarstellung und interaktive Objektmanipulation mit OpenGL", Univ. Hamburg, 1999, TS, pp. i-v and 1-88.

"PACS Workstation Software", PACSnet Technology Update, 2003, pp. 1-4.

* cited by examiner

*Primary Examiner* — Andrew W Johns
(74) *Attorney, Agent, or Firm* — Cantor Colburn LLP

(57) ABSTRACT

A device and to a method for navigation in a multi-dimensional image data set of an object, obtained by a medical imaging method, including depicting a randomly selectable first visual plane through the image data set as the first sectional image, in which a user can navigate and designate a point by means of an input device, and depicting, in addition to the first sectional image, a further, second sectional image, including another point, designated by the user in the first sectional image, in a second visual plane which intersects the image data set at that angle that corresponds to the perspective obtained during the recording of the image data set at the designated point.

14 Claims, 2 Drawing Sheets

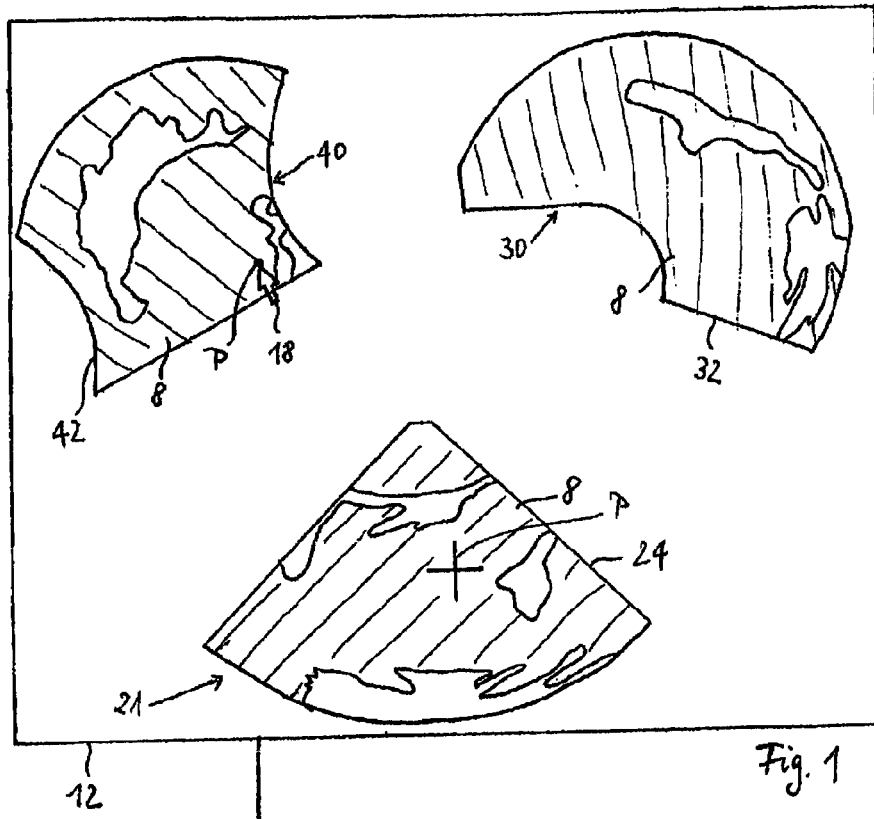
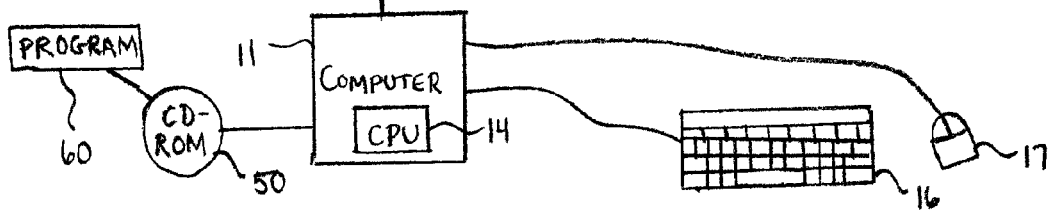
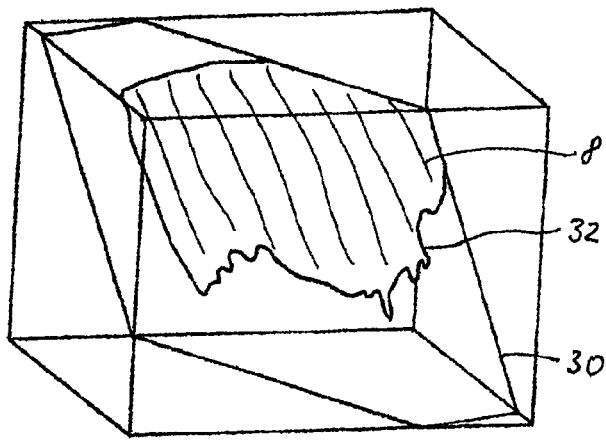
Fig. 1
Fig. 2

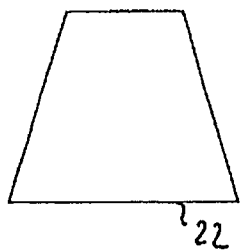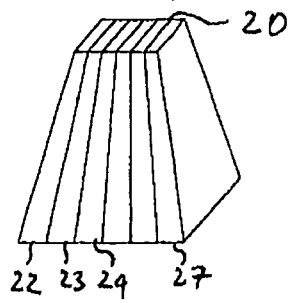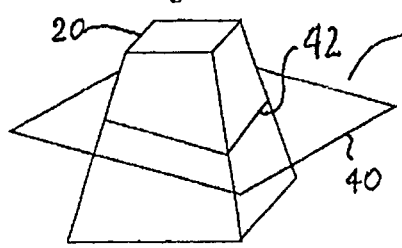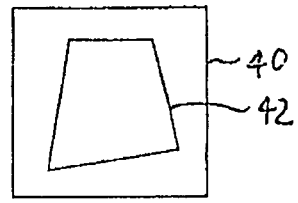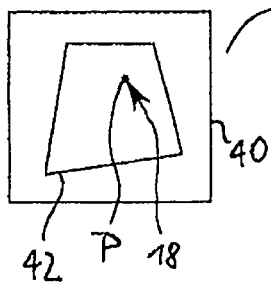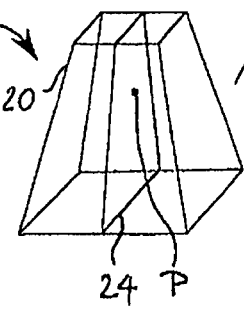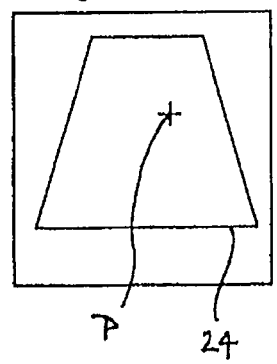

METHOD AND DEVICE FOR NAVIGATION IN A MULTI-DIMENSIONAL IMAGE DATA SET

TECHNICAL FIELD

The present invention relates to a method and a device for navigation in a multi-dimensional image data set of an object, obtained in particular by a medical imaging method.

BACKGROUND

In various imaging methods, in particular medical imaging methods, such as ultrasound, it is usual practice to take two-dimensional pictures as sectional images. Here, the two-dimensional images depicted correspond to the imaging planes of the imaging device. Furthermore, a three-dimensional or a four-dimensional image data set can be reconstructed from a series of such two-dimensional pictures. Here and hereinafter, "four-dimensional data set" means a time line of several three-dimensional data sets. After the reconstruction to a three-dimensional or four-dimensional volume or image data set, respectively, the user can view the volume in random sectional planes which he can select or which can be generated by a computer. Such sectional planes are referred to as "multiplanar reconstructions" (MPR). In so doing, however, the user loses the reference to the original two-dimensional imaging planes, to which he has gotten used after many years of practice and experience. As a result, the orientation in the multi-dimensional image data set is made more difficult since, for the reasons mentioned, the user knows the anatomy recorded mainly from the original two-dimensional sectional planes and, due to the habituation effect, can correctly orient himself only in said planes. Nor do the known devices and methods provide the user with the possibility of specifically selecting an original imaging plane.

The same applies also to a four-dimensional transesophageal echocardiography (TEE), in which an ultrasound catheter is introduced into the esophagus and rotated for cardiac imaging, as well as generally to four-dimensional real-time imaging. In particular in the case of TEE it is clear that the imaging is not possible in other perspectives since this would not be allowed, on the one hand by the anatomy of the esophagus and on the other hand by the corresponding ultrasound catheter.

BRIEF SUMMARY

The invention proposes a method and a device by means of which the navigation in a multi-dimensional, in particular a three-dimensional or four-dimensional, image data set of an object can be improved or simplified. Here, in particular image data sets of objects are of interest, which are obtained by medical imaging methods. Furthermore, the invention proposes a corresponding computer program or computer program product, in particular stored on a data carrier, for carrying out such a method or for employing such a device.

In the computer-implemented method according to the invention, a randomly selectable first visual plane, which represents a sectional plane through the multi-dimensional image data set, is depicted as a first sectional image, in which the user can navigate by means of an input device. I.e., with the help of the input device, the user can select or designate a point in the first sectional image and can displace said point during the course of the navigation. For example, a user can use the point of a mouse pointer to designate or fix such a point as a spot in three-dimensional coordinates. Due to the type of imaging in two-dimensional layers and the reconstruction to a three-dimensional or four-dimensional volume, it is possible, from this point, to find out to which original imaging layer it belonged. This picture or a sectional image calculated on the basis of the three- or four-dimensional volume with the corresponding orientation is then additionally depicted as a second sectional image, wherein it has to be noted that said second sectional image intersects the multi-dimensional image data set at that angle which corresponds to the perspective obtained during the recording of the image data set or the corresponding imaging layer at the point designated or the spot specified.

Thus, in the multi-dimensional image data set, it is possible for the user to select random planes and to navigate therein and, additionally, he is always informed in which original imaging plane the point which he has designated with the help of his input device is located. Thus, it is much easier for the user to navigate using the mode of representation to which he is used and, nevertheless, he can use the possibilities offered to him by a three- or four-dimensional image data set. Here and hereinafter "four-dimensional image data set" means a time sequence of several three-dimensional data sets. The possibility of using also the three- or four-dimensional data sets is of particular importance in those cases when it is not possible to choose a "good" section of a "good" imaging plane by means of the imaging method chosen, as is in particular the case if the movements of the measuring or sensing head are limited. For example, in the case of TEE the sensing head or the catheter essentially can be moved only axially and can be rotated about its axis, however, it can be inclined relative to this axis not at all or not substantially. The two-dimensional images acquired in this way do not show the heart in a short-axis or long-axis section. However, if, from the two-dimensional images, a three- or four-dimensional image data set is reconstructed, it is possible to select for viewing a random plane therein, e.g. in the form of a short-axis or long-axis section so that, for example, the left atrium is particularly clearly visible.

It should be further noted that the point designated by the user in the first sectional image does not necessarily have to lie entirely exactly in an original imaging plane, but can lie between two original imaging planes. In this case, a corresponding processing is carried out in order to detect a layer suitable for representation. For example, it is possible to use a so-called nearest-neighbor analysis in order to determine for the point designated by the user in the first sectional image that point which is at the same time closest to the point designated and lies in one of the two imaging planes in question. Alternatively, it is possible to use for example linear interpolation in order to calculate from the three- or four-dimensional image data set a "virtual" sectional image located between the two imaging planes in question, having the same perspective as the latter and in which the designated point lies.

The navigation through the multi-dimensional image data set can be further simplified if, in addition to the first and second sectional images, a randomly selectable third sectional plane is depicted as a corresponding third sectional image through the image data set, wherein the user can navigate also through this third sectional image by means of his input device. It is possible to designate only one point at any given time. Depending on whether the user designates a point in the first or in the third sectional image, in the second sectional image there is depicted the original imaging plane pertaining to the point designated with the perspective obtained at the point designated during the recording of the image data set. As a result, viewing, navigating and evaluating becomes more flexible.

The fields of application of the method according to the invention are increased if the spatial orientation or direction of each visual plane can be adjusted to the available anatomic conditions of the object, such as a heart, another organ or other body parts. For example, it is in many cases convenient that the first and the third visual planes are not parallel to each other, but intersect at a certain angle, wherein angles of about 60° or about 90° are particularly preferred in order to obtain a particularly good representation in the case of a two-chamber, three-chamber or four-chamber view. As a matter of course, the method according to the invention makes it also possible to depict more than three visual planes.

Thus, the user can move freely through all planes of the volume recorded and, thus, leaf through said planes. Said planes can be defined by certain anatomic landmarks, such as the mitral valve, pulmonary veins, the connection to the aorta as well as the other orifices. Apart from that, the visual planes desired by the user can also be provided or changed by the user himself.

The navigation can be even more simplified if the point designated by the user in the first or in the third sectional image is depicted in the second sectional image as a separate identification mark, such as a cross.

Furthermore, it is of particular help in the navigation if the user has access to known identification devices such as a computer mouse, a trackball or a joystick in order to designate the point or in order to navigate. Thus, the user can carry out a navigation in the same manner as in standard applications. The designated point P preferably is depicted in the first and, if applicable, in the third sectional image by an identification mark which is moved like a cursor during navigation and which corresponds to a cursor position.

It is an advantage if the representation of the second sectional image is not static but is adjusted or updated automatically if there are changes induced by the user, for example regarding the point designated by the mouse pointer. For example, the second sectional image is continually updated when the user moves the mouse pointer in the first sectional image. Alternatively, it is also possible that the representation of the second sectional image changes only when the user becomes active, for example by a mouse click. The information made available to a user as well as the manageability of the method according to the invention can be further extended if, in addition to the two-dimensional representation of the first, second and, if applicable, third as well as further visual planes a further view is depicted in a corresponding image, in which the desired visual planes are rendered together in a common representation, which is in particular three-dimension or four-dimensional (i.e. animated). For example, this may be done by a perspective transparent representation of the three-dimensional data set.

It may also be helpful for a user if he can see the object additionally in a three-dimensional representation with "volume rendering" or "surface rendering", in which the second visual plane is overlaid. Here, it can then be helpful to be able designate or select the desired point also in these representations.

The present invention can be employed in particular when the second image plane corresponds to the sound field of an ultrasonic transducer, as it is used in particular during an interactive imaging examination. The method according to the invention itself, however, is carried out preferably after the imaging examination, i.e. offline.

The above-described method, which is carried out on a computer, is preferably realized as a computer program or computer program product so that it can be used for a control and evaluation system of an imaging device, in particular for medical imaging. Accordingly, the invention also relates to a data carrier with such a computer program product stored thereon.

The invention is further achieved by means of an imaging device for navigating in a multi-dimensional image data set of an object, which data set in particular is acquired by means of a medical imaging method. Such an imaging device includes a monitor on which at least a first sectional view of the object can be depicted, as well as an identification device such as in particular a computer mouse, a trackball or a joystick, by means of which a desired point in the first sectional image can be designated. The imaging device according to the invention further comprises a control and evaluation system by means of which it is made possible to navigate in the multi-dimensional image data set using one of the above-described methods.

BRIEF DESCRIPTION OF THE DRAWINGS

Further advantages, features and particularities of the invention become evident from the following description of preferred embodiments of the invention. The Figures show:

FIG. 1 an imaging device according to the invention comprising a monitor on which three sectional images are shown according to the invention, FIG. 2a representation of a sectional plane through a heart, as it is oriented in space, FIGS. 3a and 3b a two-dimensional sectional image or a three-dimensional volume built from such sectional images, FIGS. 4a and 4b a representation of a random sectional plane through the volume or its representation as MPR, and FIGS. 5a to 5c a representation of a designated point in an MPR, in the original imaging plane in the volume and in the two-dimensional original imaging plane, respectively.

DETAILED DESCRIPTION

FIG. 1 schematically shows an imaging device 10 according to the invention. Said device comprises a computer 11 which is connected to a monitor 12. A keyboard 16 as well as a mouse 17 serve as input devices for the computer 11. The computer 11 comprises a CPU 14 which serves as a control and evaluation system. With the help of a data carrier 50, which is here symbolically shown as a CD-ROM, a computer program 60 stored thereon can be loaded into the CPU 14.

In the upper left corner of the monitor 12 a first sectional view 42 of a heart 8 is schematically depicted. The sectional image 42 is located in a first visual plane 40 through a image data set 20 which will be described more clearly later on (cf. FIGS. 3a, b). In the upper right corner of the monitor 12, there is schematically depicted a third sectional image 32 in a third visual plane 30 through a heart 8, wherein one may exemplarily assume here that the first visual plane 40 and the third visual plane 30 intersect at an angle of 90°. As a matter of course, the invention may be employed not only for the heart, but also for data sets of other objects such as various organs or other body parts, but also for inanimate matter.

The particularity of the invention is that in addition to the aforementioned first sectional image 42, there is depicted a second sectional image 24 which is shown schematically at the bottom and lies in a second visual plane 21, which second sectional image is obtained as follows. The user can use as an input device the mouse pointer 18 of a mouse 17 to designate a point P in the first sectional image 42, at which point P he would like to see the representation of said second sectional image 24. According to the invention, a particularity of the second sectional image 24 is that, at the point P, which is designated in the first sectional image 42, it intersects the image data set 20 at exactly that angle which corresponds to the perspective in which the imaging plane or the sectional image 24 was originally recorded during its recording in order to later generate the image data set 20. I.e. the user—generally a doctor—in addition to the first sectional image 42—and in this embodiment also in addition to the third sectional image 32—is presented with a further, second sectional image 24 which is not randomly oriented in space, but offers exactly the perspective or angle of view the user is used to. This measure of additionally depicting the second sectional image 24 considerably simplifies for the user the navigation in the multi-dimensional, i.e. three- or four-dimensional, image data set 20.

As an example, FIG. 2 shows a third sectional image 32 of a heart 8, as it lies in a third visual plane 30 in space.

The method according to the invention for navigating in a multi-dimensional image data set 20 will now be described with reference to FIGS. 3 to 5 using ultrasound images as example. FIG. 3a shows a two-dimensional ultrasound image which is available in the form of a two-dimensional sectional image 22. A plurality of such sectional images which are acquired over (at least) a complete heart cycle, in the example of FIG. 3b the sectional images 22 to 27, are combined by reconstruction to a three-dimensionally depicted image data set 20. The description is here limited to the three-dimensional case, although the method according to the invention can also be employed in the four-dimensional case, i.e. in the case of a time-wise variable three-dimensional image data set.

Then, the user can use his computer mouse 17 or alternatively a keyboard 16, a joystick or a trackball (not shown) to randomly place, according to FIG. 4a, a first visual plane 40 through the image data set 20 so that the visual plane 40 intersects the image data set 20. According to the representation of FIG. 4b, the intersection between the visual plane 40 and the image data set 20 then results in a first sectional image 42. The sectional image 42 is available as "multiplanar reconstruction" (MPR) in this embodiment.

Then, the user can point with the mouse pointer 18 of a mouse 17 to any random point P in the first sectional image 42 (cf. FIG. 5a), whereupon the CPU 14 determines in which original imaging plane or in which sectional image this point P lies. In the example of FIG. 5b, this is the sectional image 24 which is referred to as "the" second sectional image 24. Then, according to FIG. 5c this second sectional image 24 is depicted, wherein the point P designated in the first sectional image 42 is depicted as a cross in the second sectional image 24. Hereafter, the user can unambiguously derive which point in the second sectional image 24 is attributed to that point P which he indicates in the first sectional image 42 or in the third sectional image 32.

As a matter of course, the user can then use his mouse pointer 18 to successively indicate also various points in the third sectional image 32 and each time he is shown a corresponding second sectional image 24 in which the point P which he had indicated in the first sectional image 42 or the third sectional image 32 is designated with a cross.

Depending on the requirements, it can also be possible and expedient to depict a fourth and further sectional images. Furthermore, it may be helpful for a user if the first visual plane and the second visual plane are depicted together in a single representation, which is available in particular in three-dimensional or four-dimensional or animated form. This gives the user an even better spatial idea when navigating in the image data set 20.

In addition, it is possible to depict the heart or also any other object also three-dimensionally with "volume rendering" or "surface rendering", wherein in this case the second visual plane is overlaid in order to be able to make its position even clearer or to depict it in an alternative representation.

In the above description it has been assumed that the user can randomly or nearly randomly determine the position of the first visual plane 40 and of the second visual plane 30. Alternatively, as a matter of course, it is also possible that the imaging apparatus 10 carries out an automatic or semiautomatic selection (i.e. a user-aided selection) of the visual planes so that, for example, important anatomic details such as the mitral valve and/or the pulmonary veins are depicted. In addition, the representation can also be such that a certain long-axis section or short-axis section is generated.

Preferably, the method according to the invention is such that the representation of the second sectional image 24 is automatically adjusted to where the designated point P is currently located. I.e. the representation of the second sectional image 24 is automatically updated, without intervention by the user. Alternatively, it may be desirable for a greater stability of the representation over time to give the user the possibility of preventing that the second sectional image 24 changes too rapidly by updating the second sectional image 24 only when the user carries out a certain operation. This operation may be a mouse click or the pressing of the enter key, for example.

Thus, it has to be noted that the method according to the invention makes it possible for a user not only to navigate better and more easily in a multi-dimensional image data set 20, but he can also find certain landmarks, such as the apex or the aortic orifice, more easily.

It has to be noted that the features of the invention described with reference to the embodiments shown and described, such as the type and location of the individual visual planes and the design of individual details of representation and navigation, may also be present in other embodiments, unless it is indicated otherwise or not possible for technical reasons.

The invention claimed is:

1. A method for navigation in a multi-dimensional image data set of an object, obtained with help of a medical ultrasound imaging method and reconstructed from a series of sectional images, comprising:
   depicting a randomly selectable first visual plane through the image data set as a first sectional image, in which a user can navigate and designate a point by means of an input device, and
   depicting, in addition to the first sectional image, a further, second sectional image, comprising the point designated by the user in the first sectional image, in a second visual plane which sectional image intersects the image data set at that angle that corresponds to the perspective obtained during the recording of the image data set at the designated point.

2. The method according to claim 1, wherein
   in addition to the first sectional image and the second sectional image a randomly selectable third visual plane is depicted as a corresponding third sectional image through the image data set, through which the user can navigate by means of an input device, wherein the second sectional image contains the respective point designated by the user in the first sectional view or in the third sectional view, and intersects the image data set at the respective angle which during the recording of the image data set corresponds to the perspective obtained at the designated point.

3. The method according to claim 1, wherein an orientation of each sectional plane can be adjusted to anatomic conditions of the object.

4. The method according to claim 2, wherein the third visual plane is arranged at a certain angle to the first visual plane.

5. The method according to claim 1, wherein the designated point is depicted as an identification mark in the second sectional image.

6. The method according to claim 1, wherein the designated point is selected by means of an input device.

7. The method according to claim 1, wherein the representation of the second sectional image is automatically adjusted to changes occurring at the designated point.

8. The method according to claim 1, wherein in addition the first visual plane and the second visual plane are rendered together in one representation.

9. The method according to claim 1, wherein in addition the object is rendered in three-dimensional volume rendering representation or surface rendering representation with the second visual plane being overlaid.

10. The method according to claim 1, wherein the designated point can be selected in a volume rendering representation or surface rendering representation, respectively.

11. The method according to claim 1, wherein the second visual plane corresponds to the sound field of an ultrasonic transducer, in particular during an interactive imaging examination.

12. A data carrier comprising a non-transitory computer readable medium having stored thereon a program for a control and evaluation system of an imaging device for navigating in a multi-dimensional image data set of an object, obtained by a medical imaging method to carry out a method according to claim 1.

13. An imaging device for navigating in a multi-dimensional image data set of an object, obtained in particular by a medical imaging method, comprising
a monitor for depicting at least a first sectional image of the object,
an input device for designating a point in the first sectional image,
a control and evaluation system for navigating in the multi-dimensional image data set of the object in order to control the imaging device according to a method according to claim 1.

14. The method according to claim 1, wherein in addition the first visual plane and the second visual plane are rendered together in a three-dimensional and/or in an animated form.

* * * * *